United States Patent Office 2,788,125
Patented Apr. 9, 1957

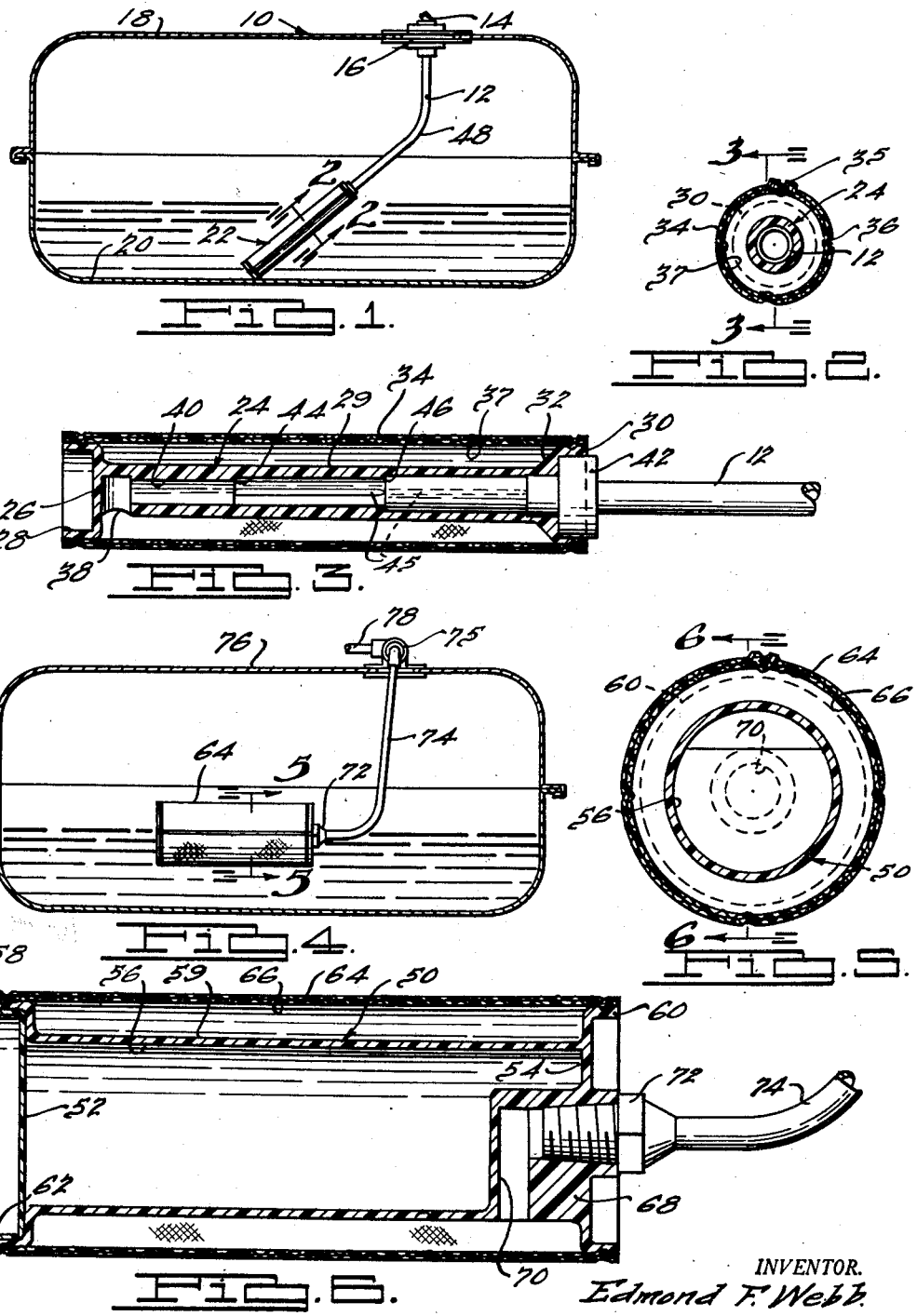

2,788,125

FUEL FILTER

Edmond F. Webb, Franklin, Mich.

Application July 31, 1953, Serial No. 371,530

5 Claims. (Cl. 210—172)

This invention relates to filters and, more particularly, to an improved fuel filter adapted for use in the fuel tank of an internal combustion engine, particularly an automotive gasoline engine.

The fuel for an engine of the indicated character is commonly stored in a fuel tank remote from the engine and suitable pump means is provided for forcing the fuel through a fuel line from the tank to the engine. There is a tendency for water to accumulate in the fuel tank due to the condensation of moisture, as well as other factors, and in order to prevent the entrance of the accumulated water, as well as dirt, grit, lint and other foreign matter, into the fuel line, the usual practice has been to provide a fuel filter which is commonly disposed in the fuel tank.

An object of the invention is to overcome disadvantages inherent in prior fuel filters of the indicated character and to provide an improved and relatively inexpensive fuel filter that prevents the entrance of water, lint, dirt and other foreign matter into the fuel line.

Another object of the invention is to provide an improved fuel filter that is compact, economical to manufacture and assemble, durable, efficient and reliable in operation.

Another object of the invention is to provide an improved fuel filter that may be easily installed in fuel tanks of various types with a minimum of labor and expense.

Another object of the invention is to provide an improved fuel filter which gradually restricts the rate of fuel flow to the engine when the fuel in the tank reaches a relatively low level but which enables sufficient fuel to flow to operate the engine at reduced power for a relatively long period of time, thereby warning the operator of the low fuel level condition and at the same time enabling him to proceed to a convenient place to refuel.

Still another object of the invention is to provide an improved fuel filter adapted to prevent the entrance of water into the fuel line even though the water is agitated to an extent sufficient to produce emulsification.

Yet another object of the invention is to provide an improved fuel filter particularly adapted to prevent the entrance of water into the fuel line even though the water reaches a relatively high level in the fuel tank.

The above as well as other objects and advantages of the invention will become apparent from the following description, taken in conjunction with the accompanying drawing wherein:

Figure 1 is a side elevational view of a fuel filter constructed in accordance with one form of the present invention and showing the same insalled in a vehicle fuel tank;

Fig. 2 is an enlarged, diametric, sectional view of the fuel filter illustrated in Fig. 1, taken on the line 2—2 thereof;

Fig. 3 is a longitudinal, sectional view of the structure illustrated in Fig. 2, taken on the line 3—3 thereof;

Fig. 4 is a side elevational view of a fuel filter constructed in accordance with another form of the invention and showing the same installed in a vehicle fuel tank;

Fig. 5 is an enlarged, diametric, sectional view of the filter illustrated in Fig. 4, taken on the line 5—5 thereof; and Fig. 6 is a longitudinal, sectional view of the structure illustrated in Fig. 5, taken on the line 6—6 thereof.

Referring to the drawing, and more particularly to Figs. 1, 2 and 3, a fuel tank is shown, generally designated 10, which may be considered to be the fuel tank of an automotive vehicle, although it will be understood that the invention is applicable to other uses. An outlet tube 12 is disposed in the fuel tank 10 and one end of the outlet tube is connected to a fuel line 14 by any suitable means, such as a fitting 16 fixed to the upper wall 18 of the tank. The outlet tube 12 extends downwardly in the tank and the lower end portion thereof terminates in upwardly spaced relationship with respect to the bottom wall 20 of the tank.

The present invention provides a fuel filter, generally designated 22, that functions to gradually restrict the rate of fuel flow to the engine when the fuel in the tank 10 reaches a relatively low level and also functions to prevent the entrance of water, lint, dirt and other foreign matter, which may be present in the tank, into the outlet tube 12. The filter 22 is comprised of an elongated tubular member 24, one end portion of which is closed by an integral end wall 26 having a substantially cylindrical flange 28 projecting axially outward of the tubular member, the periphery of the flange being disposed in radially spaced relationship to the central portion 29 of the tubular member. The other end portion of the tubular member 24 is enlarged to form an axially projecting, substantially cylindrical flange 30 which, in the preferred construction shown, is of substantially the same diameter as the flange 28 and is integrally joined to the central portion of the tubular member by a web 32.

The tubular member 24 is fitted in an elongated fabric sleeve 34, the inside diameter of which is substantially the same as the outside diameter of the flanges 28 and 30. The sleeve 34 is preferably formed from a plurality of layers of plastic cloth, the layers being rolled and bonded together in overlapping relationship along the longitudinal edge portions thereof, as at 35. The layers of cloth are also bonded at circumferentially spaced points 36 for the purpose of preventing the layers from separating and the end portions of the sleeve 34 are bonded to the flanges 28 and 30 by any suitable means, such as dielectric heating or by the use of a suitable bonding material which is not affected by the liquids in the tank, so as to seal the ends of the annular chamber 37 which surrounds the tubular member 24. In order to facilitate the bonding of the sleeve to the flanges 28 and 30 of the tubular member, the sleeve and the tubular member are preferably made of the same plastic material, which will be described hereinafter in greater detail.

The fabric which forms the sleeve 34 may be made from a variety of plastic filaments or plastic-coated filaments which are not readily wetted by water but which may be wetted relatively easily by a hydrocarbon fuel, such as gasoline. Plastic materials which fall into this category and which are suitable for the purposes of the present invention include polyvinylidene chloride available commercially under the designation "Saran" from the Dow Chemical Company, and highly fluorinated polymeric hydrocarbons, such as tetrafluoroethylene, available commercially under the designations "Teflon" and "Kel-F" from the E. I. du Pont Company and M. W. Kellogg Company, respectively.

The fabric is preferably woven from monofilaments of the indicated character, the weave being selected so as to prevent penetration of a minimum sized particle of dirt or other foreign matter through the interstices of the fabric. The porosity of the fabric forming the sleeve 34 is adjusted, as by press-polishing, calendering, or weave manipulation to provide the desired water separation characteristics and the surface area of the sleeve is determined in accordance with the required rate of fuel delivery, as for example, fifteen gallons per hour. A square weave of eighty by eighty count with a .010 inch diameter monofilament has been found eminently satisfactory for use with gasoline. Since the plastic from which the fabric is woven is not readily wetted by water but is easily wetted by the hydrocarbon fuel, such a construction permits the passage of the fuel through the interstices of the fabric into the chamber 36 but prevents the passage of water into the chamber 36. The close proximity of the individual layers of the fabric forming the sleeve 34 also provides a labyrinth that serves to entrap lint which may be present in the fuel. Such a construction also serves to entrap fine particles of dirt which may be present in the fuel tank. The fine particles of dirt are entrained by the water and since the water does not pass through the sleeve 34, the fine particles do not pass through either. Thus, the present invention provides a micronic filter which obviates the plugging difficulties of prior micronic filters.

In order to permit fuel which enters the chamber 36 through the fabric sleeve 34 to flow into the bore 40 of the tubular member, an opening 38 is provided in the wall of the tubular member 24 at a position adjacent the end wall 26. The outlet tube 12 extends through a collar 42 which snugly fits the enlarged portion of the bore defined by the flange 30 at the distal end of the bore 40 and the inlet portion of the outlet tube projects into the bore 40 and snugly fits the central portion 29 of the tubular member.

In order to insure a snug fit between the outlet tube 12 and the central portion 29 of the tubular member, a plurality of flats 45 may be provided on the wall of the bore 40 so that when the outlet tube is pressed into the bore, the central portion 29 will be distorted so as to tightly fit the tube. Such a construction reduces the manufacturing tolerances of the mean diameter of the bore 40 and the outside diameter of the tube 12 and insures a friction fit therebetween which prevents the leakage of air along the periphery of the tube 12. For the purpose of providing abutment stops for outlet tubes of various sizes, the diameter of the bore 40 may be progressively reduced at spaced points, as at 44 and 46.

In order that the level of the fuel will be relatively low when restriction to the delivery is obtained, the filter of this embodiment of the invention is preferably mounted at an angle inclined to the vertical axis of the tank, as brought out in Fig. 1, and to facilitate such mounting, the outlet tube is bent as at 48. Thus, maximum fuel flow may be obtained until the fuel reaches a relatively low level in the tank, after which the rate of fuel flow is gradually reduced, thereby warning the operator of the low fuel level condition but enabling him to proceed at reduced power for a relatively long period of time so that he may refuel at a convenient place. By way of example, the filter may be mounted so that the restriction in the fuel occurs when approximately one-half of one gallon of usable fuel remains in the tank above the water level, thereby warning the operator but enabling him to proceed at reduced power for a number of miles.

Another embodiment of the invention is illustrated in Figs. 4 through 6, particularly adapted for use in fuel tanks wherein a relatively large amount of water may accumulate, as for example, in the fuel tanks of military vehicles adapted for underwater operation.

In this embodiment of the invention, the filter is comprised of an elongated tubular member 50 which is closed at one end by an end wall 52 and at the other end by an integral end wall 54 so as to define a closed chamber 56. The chamber 56 is filled with air or other suitable gas and the volume of the chamber 56 is proportioned to the weight of the filter so that the filter will float in water but will submerge in a hydrocarbon fuel, the buoyant effect of the chamber 56 preferably being proportioned to the weight of the filter so that the longitudinal axis of the filter will be disposed adjacent the plane of separation between the two fluids in the event a relatively large amount of water accumulates in the tank. One end of the tubular member 50 is provided with an integral, substantially cylindrical, axially projecting flange 58, the outer surface of which terminates in radially spaced relationship with respect to the central portion 59 of the tubular member 50 while the other end of the tubular member is provided with a similar flange 60 of substantially the same diameter as the flange 58. The marginal portion of the end wall 52 is formed in the shape of a flange 62 which is bonded to the flange 58 by any suitable means. The tubular member 50 is fitted in an elongated, plastic, fabric sleeve 64, the end portions of which are bonded to the flanges 58 and 60 so as to seal the ends of the annular chamber 66 which surrounds the tubular member 50.

The sleeve 64 may be made in the manner previously described from a plurality of layers of plastic fabric which is not readily wetted by water but which is readily wetted by a hydrocarbon fuel, thereby permitting the fuel to pass through the interstices of the fabric into the chamber 66 but substantially preventing the passage of water into the chamber.

The tubular member 50 is provided with an axially offset body portion 68 adjacent the flange 60 and the body portion 68 is provided with a bent passageway 70, the inner end of which communicates with the chamber 66 while the outer end portion is adapted to threadably accommodate a fitting 72 provided on one end of an outlet tube 74.

In the preferred embodiment shown, the upper end portion of the outlet tube 74 is pivotally connected by a conventional fitting 75 to the top wall 76 of the fuel tank and communicates with a fuel line 78. With such a construction, the filter of this embodiment of the invention may rise and fall as the level of the water in the tank changes. It will be understood, however, that the outlet tube 74 may take the form of a flexible tube or hose which will bend, thereby permitting the filter to rise and fall with the level of the water in the tank.

Because of the differences in the specific gravities of water and the hydrocarbon fuel, it will be appreciated that any water which accumulates in the tank will settle to the bottom so that a plane of separation will occur between the two fluids, the water being disposed below the fuel.

In operation, the filter of this embodiment of the invention will float on the accumulated water but will be submerged in the fuel because of the previously described buoyant effect of the chamber 56. The fuel will then pass into the chamber 66, through the portion of the sleeve 64 which projects above the water level. The fuel then flows out of the chamber 66 through the passageway 70 into the outlet tube 74. When the fuel covers the portion of the sleeve 64 that is disposed above the water level, the maximum rate of fuel flow through the sleeve 64 into the chamber 66 will be obtained. When the fuel level falls below the top of the sleeve 64, as viewed in Fig. 4, the rate at which the fuel passes through the sleeve into the chamber 66 will gradually decrease so that a gradual restriction in the rate at which the fuel flows to the engine will occur. Thus, the operator is warned of the low fuel level but at the same time he is enabled to proceed to reduced power for a relatively long period of time so that he may refuel at his convenience.

While preferred embodiments of the invention have been shown and described, it will be understood that various changes and modifications may be made without departing from the spirit of the invention.

What is claimed is:

1. In combination with a fuel tank, a fuel filter comprising a fabric sleeve defining a chamber, said sleeve being made from a material which is readily wetted by a hydrocarbon fuel but which is not readily wetted by water, said sleeve permitting the passage of a hydrocarbon fuel through the interstices thereof but substantially preventing the passage of water therethrough, means secured to the opposite end portions of said sleeve and closing the ends of the chamber defined by said sleeve, said filter being disposed in said tank so that the rate of flow of fuel through said sleeve is gradually reduced as the level of the fuel in the tank drops below the uppermost portion of said sleeve, an outlet tube defining a bore and having a portion thereof extending downwardly in said tank, the lower end portion of the said outlet tube projecting into the chamber defined by said sleeve so that the bore of said outlet tube communicates with the chamber defined by said sleeve, and means securing the distal end portion of said outlet tube to said tank.

2. In combination with a fuel tank, a fuel filter comprising a fabric sleeve, said sleeve being formed from a material which is readily wetted by a hydrocarbon fuel but which is not readily wetted by water, a tubular member closed at each end so as to define an impervious inner chamber, the buoyant effect of the inner chamber being sufficient to float said filter in water but insufficient to float said filter in a hydrocarbon fuel, said tubular member having flange portions on the ends thereof terminating in radially spaced relationship with respect to the central portion of said tubular member, said central portion being spacedly interfitted in said sleeve to form an annular chamber therebetween, the end portions of said sleeve being secured to said flange portions so as to form a fluid tight seal at each end of the annular chamber, an outlet tube defining a bore and extending downwardly in said tank, the lower end of said outlet tube being connected to said filter so that the bore of the outlet tube communicates with the annular chamber, and means flexibly connecting the distal end portion of said outlet tube to said tank.

3. A fuel filter comprising, in combination, a fabric sleeve defining an elongate chamber closed at one end, said sleeve being made from a material which is readily wetted by a hydrocarbon fuel but which is not readily wetted by water, said sleeve permitting the passage of a hydrocarbon fuel through the interstices thereof but substantially preventing the passage of water therethrough, and an end member secured to the other end portion of said sleeve in fluid tight relationship, said end member being made from the same material as said sleeve, said end member defining an aperture communicating with the chamber defined by said sleeve and adapted to receive a fuel conduit.

4. A fuel filter comprising, in combination, a tubular member having a wall defining an axially extending passageway closed at one end, said tubular member being provided with radially outwardly extending flange portions on the ends thereof greater in diameter than the central portion thereof, a fabric sleeve spacedly surrounding the central portion of the said tubular member so as to define an annular chamber therebetween, said sleeve being made from a material which is readily wetted by a hydrocarbon fuel but which is not readily wetted by water, said sleeve permitting the passage of a hydrocarbon fuel through the interstices thereof but substantially preventing the passage of water therethrough, said tubular member being made from the same material as said sleeve, the end portions of said sleeve being secured to said flange portions of said tubular member so as to form a fluid tight seal at each end of the chamber, said wall of said tubular member also having an outlet opening therein interconnecting the passageway defined by said wall with the chamber.

5. A fuel filter comprising, in combination, an elongate fabric sleeve, said sleeve being made from a material which is readily wetted by a hydrocarbon fuel but which is not readily wetted by water, said sleeve permitting the passage of a hydrocarbon fuel through the interstices thereof but substantially preventing the passage of water therethrough, an elongate tubular member closed at each end so as to define an impervious inner chamber, said tubular member being formed from the same material as said sleeve, the buoyant effect of the inner chamber being sufficient to float said filter in water but insufficient to float said filter in a hydrocarbon fuel, said tubular member having radially outwardly extending flange portions on the ends thereof terminating in radially spaced relationship with respect to the central portion of said tubular member, said central portion being spacedly interfitted in said sleeve to form an annular chamber therebetween, the end portions of said sleeve being secured to said flange portions so as to form a fluid tight seal at each end of the annular chamber, said tubular member also defining an outlet passageway communicating with the annular chamber.

References Cited in the file of this patent

UNITED STATES PATENTS

| | | |
|---|---|---|
| 1,548,271 | Lane | Aug. 4, 1925 |
| 1,787,577 | Hills | Jan. 6, 1931 |
| 2,371,895 | Kingman | Mar. 20, 1945 |
| 2,555,607 | Robinson | June 5, 1951 |
| 2,657,808 | Mankin | Nov. 30, 1953 |
| 2,711,828 | Webb et al. | June 28, 1955 |